United States Patent [19]

Schaefer, Jr. et al.

[11] Patent Number: 5,751,609
[45] Date of Patent: May 12, 1998

[54] NEURAL NETWORK BASED METHOD FOR ESTIMATING HELICOPTER LOW AIRSPEED

[75] Inventors: Carl G. Schaefer, Jr., Woodbridge, Va.; Kelly M. McCool, University Park; David J. Haas, North Potomac, both of Md.

[73] Assignee: The United States of America as represented by the Secretary of the Navy, Washington, D.C.

[21] Appl. No.: 740,067

[22] Filed: Oct. 24, 1996

[51] Int. Cl.$^6$ ................................................... G01C 21/10
[52] U.S. Cl. .......................... 364/565; 364/158; 395/23; 73/178 H
[58] Field of Search ........................ 364/565, 148, 364/446, 149, 150, 151, 157, 276.6, 424.012, 424.013, 440, 950, DIG. 1, DIG. 2, 21; 395/21, 23, 22, 24, 27, 11; 244/17.13, 182; 73/178 H

[56] References Cited

U.S. PATENT DOCUMENTS

| | | | |
|---|---|---|---|
| 4,023,409 | 5/1977 | Durand | 73/178 H |
| 4,300,200 | 11/1981 | Doe | 364/565 |
| 4,702,106 | 10/1987 | Hassenpflug et al. | 73/181 |
| 4,794,793 | 1/1989 | Farre et al. | 73/178 |
| 4,829,441 | 5/1989 | Mandle et al. | 364/434 |
| 4,893,261 | 1/1990 | Flint, III et al. | 365/565 |
| 5,063,777 | 11/1991 | Arethens et al. | 73/178 H |
| 5,121,325 | 6/1992 | DeJonge | 364/442 |
| 5,214,596 | 5/1993 | Muller | 364/565 |
| 5,225,829 | 7/1993 | Bateman | 340/967 |
| 5,457,634 | 10/1995 | Chakravarty | 364/444 |

OTHER PUBLICATIONS

McCool, Kelly M., David J. Haas and Carl G. Schaefer Jr., "A Neural Network Based Approach to Helicopter Low Airspeed and Sideslip Angle Estimation," Proceedings of American Institute of Aeronautics and Astronautics Flight Simulation Technologies Conference, Paper no. 96–3481 (Jul. 29–31, 1996) pp. 91–101.

*Primary Examiner*—James P. Trammell
*Assistant Examiner*—Shah Kaminis
*Attorney, Agent, or Firm*—John Forrest; Gary Borda; Jacob Shuster

[57] ABSTRACT

The invention is directed to a method, utilizing a neural network, for estimating helicopter airspeed in the low airspeed flight range of below about 50 knots using only fixed system parameters as inputs to the neural network. The method includes the steps of: (a) defining input parameters derivable from variable state parameters generated during flight of the helicopter and measurable in a nonrotating reference frame associated with the helicopter; (b) determining the input parameters and a corresponding helicopter airspeed at a plurality of flight conditions representing a predetermined low airspeed flight domain of the helicopter; (c) establishing a learned relationship between the determined input parameters and the corresponding helicopter airspeed wherein the relationship is represented by at least one nonlinear equation; (d) storing the at least one nonlinear equation in a memory onboard the helicopter; (e) measuring real time values of the variable state parameters during low airspeed flight of the helicopter; (f) calculating real time values of the input parameters; (g) storing the real time values of the input parameters in the memory; (h) processing the real time values of the input parameters in accordance with the at least one nonlinear equation to determine real time airspeed; and (i) displaying the real time airspeed.

17 Claims, 6 Drawing Sheets

NEURAL NETWORK BASED METHOD FOR ESTIMATING HELICOPTER LOW AIRSPEED

STATEMENT OF GOVERNMENT RIGHTS

The invention described herein may be manufactured and used by or for the Government of the United States of America for governmental purposes without the payment of any royalties thereon or therefor.

BACKGROUND OF THE INVENTION

1. Field of Invention

The present invention relates generally to virtual sensors and, more particularly, to a means and method utilizing a neural network for estimating helicopter airspeed at speeds below about 50 knots using only fixed system parameters (i.e., parameters measured or determined in a reference frame fixed relative to the helicopter fuselage) as inputs to the neural network.

2. Brief Description of Related Art

Helicopters are designed for a wide variety of missions including anti-submarine warfare, vertical replenishment, and search and rescue missions. Although helicopters routinely operate at forward airspeeds above 100 knots, such missions require that a large portion of flight time be conducted in the low airspeed flight regime (i.e., airspeeds below about 50 knots). Because flight in the low airspeed regime requires increased power, accurate low airspeed data is needed to maintain control margins. Low airspeed data is needed by pilots flying instrument approaches in order to maintain critical control authority, particularly in connection with tail-rotor effectiveness. On attack helicopters, low airspeed information is critical to accurate weapons firing solutions. In addition, high vibratory loads can occur in some low airspeed maneuvers resulting in fatigue damage accumulation in flight critical components. Technology for monitoring the safe life remaining on such flight critical components has been developed through helicopter usage monitoring and flight regime recognition techniques, e.g., Health and Usage Monitoring Systems (HUMS). Normally, information from multiple sensors must be examined collectively to make diagnostic and prognostic decisions. However, the success of HUMS technology in the low airspeed regime is dependent on accurate low airspeed information. Without correct low airspeed information, usage monitoring algorithms cannot recognize the low airspeed maneuvers and, therefore, may not register critical fatigue accumulation data.

Due to inaccuracy associated with use of traditional pitot-static probes in a low airspeed environment, as well as with interference generated by the main rotor downwash, instrumentation for accurately measuring airspeed and sideslip angle in the low airspeed regime is generally lacking. Thus, although accurate low airspeed information is needed by pilots and monitoring algorithms, it is not available using traditional methods of measuring airspeed and sideslip angle.

Development of a measurement system that accurately estimates low airspeed and sideslip angle has long been a difficult challenge. Interest in low airspeed measurement began in the 1950s when preliminary concepts were developed and flight tested. These concepts involved mounting probes above the rotor hub as well as in the wake beneath the rotor. Since the 1950s, these concepts have been refined and a variety of low airspeed sensor designs have been flight tested. One such system employs two venturi tubes on opposite ends of a rotating arm installed above the rotor hub to measure true airspeed magnitude and direction, e.g., LORAS (Low Range Airspeed System) produced by the Pacer Company of the United States. The differential pressure between the two sensors is used to calculate the airspeed and sideslip angle. Such systems, however, require slip ring assemblies or some other means of transferring data from the rotating reference frame of the rotor to the fixed (i.e., nonrotating) reference frame of the fuselage. Another approach involves a sensor designed to be mounted under the rotor wherein the nature of the wake is used to determine helicopter airspeed, e.g., LASSIE (Low Air Speed Sensing and Indicating System) produced by the GEC Company of England. This system uses a pitot-static probe which can rotate about 360° to provide airspeed and sideslip angle information. However, the flow environment under the rotor system is complex and empirical methods are used to linearize the output. Several other techniques, including those using ultrasonic transmission times and shed vortex characteristics, have been proposed for deducing low airspeed and sideslip angle information.

The search for an effective low airspeed sensor has long been a difficult challenge for the helicopter R&D sector. Few proposed solutions have made it into use. Most proposed low airspeed measurement systems are externally mounted and require transferring information from a reference frame rotating with the rotor to a reference frame fixed relative to the helicopter fuselage (i.e., a helicopter fixed system of coordinates XYZ originating in the helicopter fuselage). Due to the mechanical complexity, expense, and increased drag introduced by proposed low airspeed measurement systems, most helicopters are not equipped with low airspeed sensors. Moreover, in many cases, physical sensors cannot be affordably and reliably applied in an operational environment on military helicopters. Thus, the vast majority of commercial and military helicopters in use today do not have an airspeed system that can accurately measure airspeed below about 50 knots even though this is within the flight regime of the helicopter. Generally, investment in low airspeed measurement equipment is reserved for those aircraft with a critical low airspeed mission. Consequently, there is a need for a simple, low cost means and method for determining low airspeed and sideslip angle experienced by the helicopter.

SUMMARY OF THE INVENTION

Accordingly, it is an object of the present invention to provide a means and method for simply, accurately, and economically determining helicopter low airspeed information (i.e., airspeed and sideslip angle below about 50 knots).

It is a further object of the present invention to provide a means and method for determining helicopter low airspeed using only input parameters derived in the fixed reference frame of the helicopter fuselage.

It is still a further object of the present invention to provide a means and method employing existing flight sensors supplying fixed frame parameters to a neural network for estimating low airspeed.

It is yet a further object of the present invention to provide a means and method for determining helicopter low airspeed using capable of being embedded into a helicopter's existing flight data recording system.

Other objects and advantages of the present invention will become apparent to those skilled in the art upon a reading of the following detailed description taken in conjunction with the drawings and the claims supported thereby.

In accordance with one embodiment of the present invention, these objects are met by providing a method for estimating airspeed information of a helicopter operating in a low airspeed flight range of below about 50 knots. The method includes the steps of: (a) defining input parameters derivable from variable state parameters generated during flight of the helicopter and measurable in a nonrotating reference frame associated with the helicopter; (b) determining the input parameters and a coinciding reference speed information at a plurality of flight conditions representing a predetermined low airspeed flight domain of the helicopter; (c) establishing a learned relationship between the determined input parameters and the coinciding reference speed information wherein the relationship is represented by at least one nonlinear equation; (d) storing the at least one nonlinear equation in a memory onboard the helicopter; (e) measuring real time values of the variable state parameters during low airspeed flight of the helicopter; (f) calculating real time values of the input parameters; (g) processing the real time values of the input parameters in accordance with the at least one nonlinear equation to determine, in real time, the airspeed information; and (h) displaying the real time airspeed information. By continuously repeating steps (e) through (h) at a predetermined sampling rate during low airspeed flight, airspeed of the helicopter is estimated and displayed in a real time fashion.

When the airspeed information is low airspeed of the helicopter, the coinciding reference speed information is a coinciding reference speed of the helicopter. Then, step (c) may be performed using a neural network that has been trained with training exemplars that correspond to the input parameters and the coinciding reference speed. The training exemplars are measured at a plurality of flight conditions representative of a flight domain experienced by the helicopter below about 50 knots. Thus, step (c) results in at least one airspeed equation representing a non-linear input-output relationship between the input parameters and the reference speed.

Additionally, when the airspeed information is a sideslip angle during low airspeed flight of the helicopter, the coinciding reference speed information is a coinciding reference sideslip angle of the helicopter. Then, step (c) may be performed using a neural network that has been trained with training exemplars that correspond to the input parameters, a coinciding reference speed and the coinciding reference sideslip angle which is derived from the coinciding reference speed. The training exemplars are measured at a plurality of flight conditions representative of a flight domain experienced by the helicopter below about 50 knots. Thus, step (c) results in at least one sideslip equation representing a non-linear input-output relationship between the input parameters and the reference sideslip angle.

The present method may include the further step, performed prior to step (f), of inputting into the memory at least one initial parameter used during step (f) to calculate the input parameters. The input parameters determined during step (b) and calculated during step (f) include: helicopter gross weight; helicopter center of gravity; longitudinal cyclic stick position; lateral cyclic stick position; collective stick position; pilot pedal position; pitch attitude; roll attitude; pitch rate; roll rate; yaw rate; at least one engine torque; at least one rotor rotational speed; and helicopter altitude.

In accordance with another embodiment of the present invention, a method of determining low airspeed of a helicopter is provided. The method includes the steps of: measuring, in a nonrotating reference frame associated with the helicopter, a plurality of variable state parameters generated during flight of the helicopter; determining a plurality of input parameters based on the measured variable state parameters; placing the plurality of input parameters in a memory; and processing the plurality of input parameters by means of a neural network that has been trained with a plurality of training exemplars corresponding to the variable state parameters and a coinciding reference speed of the helicopter. The training exemplars are measured at a plurality of flight conditions representing a predetermined low airspeed flight domain of the helicopter. The neural network is responsive to values of the variable state parameters not previously encountered for deriving low airspeed of the helicopter based upon the plurality of input parameters. The measuring, determining, storing and processing steps may be continuously repeated during low airspeed flight of the helicopter resulting in a real time indication of helicopter low airspeed.

The current method may include the further step, performed prior to said measuring step, of inputting into the memory at least one initial parameter to be used during the determining step to determine the input parameters, and the further step of displaying the low airspeed derived during the processing step. Preferably, the inputting step includes inputting a takeoff weight and a takeoff center of gravity position of the helicopter. Additionally, the measuring step is performed at a predetermined sampling rate and includes the steps of measuring: fuel expended; longitudinal cyclic stick position; lateral cyclic stick position; collective stick position; pedal position; pitch rate, roll rate, and yaw rate; at least one engine torque; at least one rotor rotational speed; and static pressure and/or temperature of the surrounding air.

BRIEF DESCRIPTION OF THE DRAWINGS

The foregoing objects and other advantages of the present invention will be more fully understood by reference to the following description taken in conjunction with the accompanying drawings wherein like reference numerals refer to like or corresponding elements throughout and wherein.

DETAILED DESCRIPTION OF THE PREFERRED EMBODIMENT

The present invention provides means and method that utilize neural network technology for estimating helicopter low airspeed (i.e., airspeed below about 50 knots) using parameters measured or determined in a reference frame fixed relative to the helicopter fuselage as inputs to the neural network. Airspeed is a measure of the helicopter's velocity relative to the surrounding air. One embodiment of the present invention provides a virtual sensor employing advanced neural networks for estimating helicopter low airspeed in a real time fashion. A further embodiment of the present invention provides a system for estimating airspeed of a helicopter below about 50 knots in response to variable state parameters generated during flight of the helicopter and measured in the fixed (i.e., nonrotating) reference frame associated with the helicopter. A still further embodiment of the present invention provides a method for estimating real time airspeed of a helicopter operating below about 50 knots. Additionally, the present invention can be used to determine sideslip angle of a helicopter operating at low airspeeds. Certain aspects of the present invention are presented in: McCool, Kelly M., David J. Haas and Carl G. Schaefer, Jr., "A Neural Network Based Approach to Helicopter Low Airspeed and Sideslip Angle Estimation," Proceedings of American Institute of Aeronautics and Astronautics Flight Simulation Technologies Conference, Paper No. 96-3481 (Jul. 29-31, 1996) pp. 91-101, incorporated herein by reference.

Figure 1:
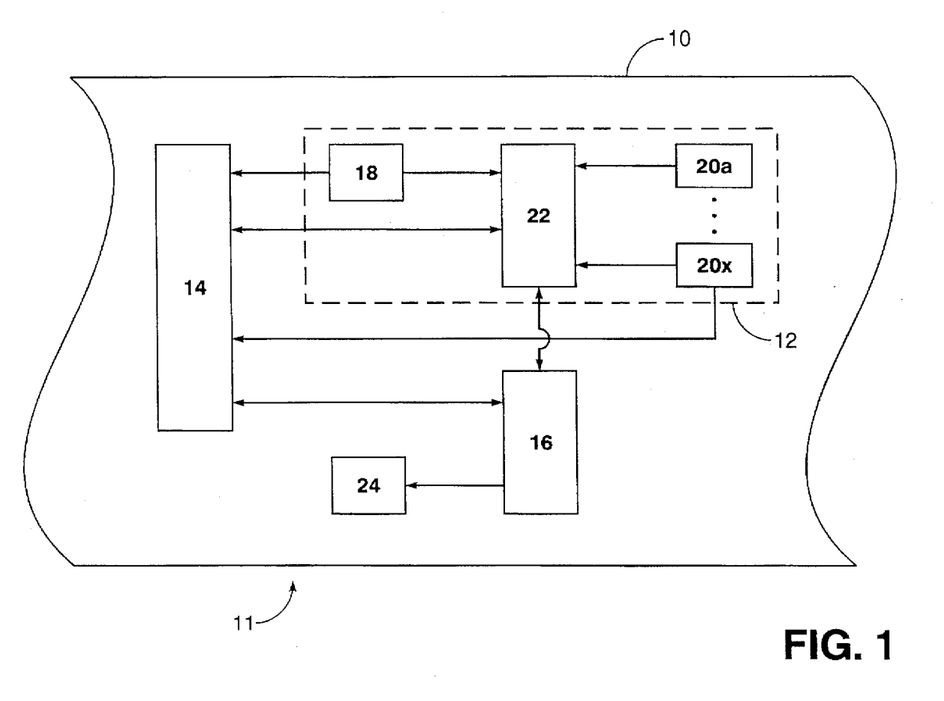
FIG. 1 is a symbolic representation of one embodiment of the present invention installed on a helicopter.

Referring now to the drawings, and particularly to FIG. 1, which symbolically depicts the present invention installed onboard helicopter 10. Virtual sensor 11 in accordance with the present invention includes: determining means 12 for determining input parameters and for generating successive signals representing the input parameters; at least one equation representing a nonlinear input-output relationship between the input parameters and a desired output, e.g., low airspeed or sideslip angle; memory means 14 for storing the at least one equation and for successively receiving (and optionally storing) signals from determining means 12; and processing means 16 operatively coupled to memory means 14 and responsive to signals received from memory means 14 for generating desired output signals based on the input parameters and the at least one equation. Determining means 12 preferably includes input means 18 for entering initial parameters, measuring means 20a through 20x for measuring variable state parameters, and means 22 for calculating the input parameters based on the initial parameters and the variable state parameters. Input means 18 may be used to enter initial parameters into memory 14 and/or into means 22 for calculating the input parameters. With respect to measuring means 20a–20x, x indicates the number of measuring means used to measure the variable state parameters. Each measuring means 20a–20x generates signals representing values of the particular variable state parameter measured and transmits the signals to memory 14 and/or to means 22 for calculating the input parameters. The invention may further include display means 24 operatively coupled to processing means 16 for receiving the desired output signals from processing means 16 and for providing an indication of the desired output in response thereto.

Determining means 12 derives input parameters from the entered initial parameters and the variable state parameters measured during low speed flight. Desired output, e.g., helicopter airspeed, is estimated in a real time fashion by continuously updating, at a predetermined sampling rate, measured values of the variable state parameters and calculated values of the input parameters for input into processing means 16. Appropriate sampling rates may be from 1 to 20 samples per second (Hz) and preferably about 8 to 10 Hz.

As shown in Table 1 below, exemplary input parameters determined by determining means 12 for use with the present invention may include: (1) helicopter gross weight during flight; (2) helicopter center of gravity position during flight; (3) longitudinal cyclic stick position; (4) lateral cyclic stick position; (5) collective stick position; (6) pilot pedal position; (7) pitch attitude; (8) roll attitude; (9) pitch rate; (10) roll rate; (11) yaw rate; (12) at least one engine torque (if the helicopter has more than one engine, the torque of one or more of the engines may be measured and used as input parameters); (13) at least one rotor rotational speed (if the helicopter has more than one main rotor, the rotational speed of one or more of the rotors may be measured and used as input parameters); and (14) helicopter altitude.

Exemplary initial parameters may include the helicopter gross weight at takeoff (i.e., weight of helicopter, fuel, and cargo) and the helicopter center of gravity position at takeoff. Exemplary easily measurable variable state parameters may include: (1) fuel expended during flight; (2) longitudinal cyclic stick position; (3) lateral cyclic stick position; (4) collective stick position; (5) pilot pedal position; (6) pitch rate; (7) roll rate; (8) yaw rate; (9) engine torque(s); (10) rotor rotational speed(s); and (11) static pressure and/or temperature of the surrounding air. Measuring means, 20a–20x, includes sensors, 20a–20x, for sampling the variable state parameters at the predetermined sampling rate.

The variable state parameters are an indication of pilot control inputs and helicopter response at a particular time during flight. The variable state parameters are measured in a nonrotating reference frame fixed relative to the helicopter fuselage (i.e., a helicopter fixed system of coordinates XYZ originating in the helicopter fuselage). Generally, the helicopter fixed reference frame includes an X axis parallel to the helicopter longitudinal (fore-aft) axis, a Y axis parallel to the helicopter lateral (port-starboard) axis, and a vertical Z axis orthogonal to the X and Y axes. By only using parameters measured in the fixed system, or derived from parameters measured in the fixed system, the need for using complicated methods of transferring data from the rotating system of the rotor to the fixed system of the fuselage is avoided. Most prior art systems require that such data be transferred from a rotating to a fixed system.

TABLE 1

| Input Parameter | How Input Parameter is Determined |
| --- | --- |
| Gross Weight | derived from takeoff gross weight minus measured weight of fuel burned |
| Center of Gravity | derived from takeoff center of gravity and cg shift due to measured weight fuel burned |
| Longitudinal cyclic stick position | measured directly using position detector |
| Lateral cyclic stick position | measured directly using position detector |
| Collective stick position | measured directly using position detector |
| Pedal position | measured directly using position detector |
| Pitch additude | derived by integrating measured pitch rate |
| Roll attitude | derived by integrating measured roll rate |
| Pitch rate | measured directly using rate gyro |
| Roll rate | measured directly using rate gyro |
| Yaw rate | measured directly using rate gyro |
| Engine torque(s) | measured directly using torque meter(s) |
| Rotor speed(s) | measured directly using tachometer(s) |
| Altitude | derived from measured static pressure and or temperature |

In the preferred embodiment, memory means 14, processing means 16, input means 18, means 22 for calculating the input parameters, and display means 24 are components of an onboard computer system. For example, input means 18 is a computer keyboard, memory means 14 is at least one computer memory device (e.g., RAM and/or EPROM), processing means 16 and calculating means 22 are one or more computer processors, and display means 24 is a computer monitor. A software representation of the at least one neural network equation is developed and installed into the onboard computer system as, for example, source code (e.g., C source code) in a hard drive, Flash memory, or as an EPROM chip. Measuring means, $20a$–$20x$, may comprise sensors installed for use with the present invention and/or may include existing flight data sensors already onboard the helicopter. Preferably, the computer system and sensors are part of a flight data recording system and/or automatic flight control system onboard the helicopter.

Input parameters are determined during flight and entered or transmitted to the computer system for use with the source code representation of the neural network equations to estimate airspeed. As shown in Table 1, exemplary input parameters are determined as follows: (1) helicopter actual gross weight during flight is determined from the helicopter gross weight at takeoff (an initial parameter) minus the weight of fuel burned (derived from fuel expended which is a measured variable state parameter measured, e.g., using a standard helicopter fuel gauge); (2) position of the center of gravity (cg) during flight is determined from the cg at take off (an initial parameter) and the cg shift due to weight of fuel expended; (3) longitudinal cyclic stick position, (4) lateral cyclic stick position, and (5) collective stick position are variable state parameters measured directly using position detectors or transducers for detecting the position of the cyclic or collective stick, e.g., rotary or linear variable differential transformers for measuring linear or angular displacement of the cyclic or collective stick as a percentage of maximum displacement; (6) pilot pedal position is a variable state parameter measured directly using position detectors or transducers for detecting the position of the pedal, e.g., rotary or linear variable differential transformers for measuring linear or angular displacement of the pedal as a percentage of maximum displacement; (7) pitch rate, (8) roll rate, and (9) yaw rate are variable state parameters measured directly using, e.g., rate gyros (generally one gyro for each of pitch, roll and yaw); (10) pitch attitude and (11) roll attitude are derived by integrating measured pitch rate and roll rate, respectively; (12) engine torque is a variable state parameter measured directly using a torque meter; (13) rotor speed is a variable state parameter measured directly using a tachometer; and (14) altitude (pressure altitude or density altitude) is derived from the measured static pressure and/or temperature of air surrounding the helicopter (a variable state parameter). Sensors $20a$–$20x$ for measuring the variable state parameters and methods of obtaining derived quantities are well known in the art and will not be discussed in detail herein.

In a preferred embodiment, the at least one equation includes at least one airspeed equation representing a nonlinear input-output relationship between the plurality of input parameters and airspeed and operative for determining low airspeed based upon the plurality of input parameters. The at least one airspeed equation is derived by means of a neural network that has been trained using training exemplars corresponding to the plurality of input parameters and a coinciding reference speed of the helicopter. The training exemplars are determined at a plurality of flight conditions representing a predefined low airspeed flight domain of the helicopter (i.e., flight domain experienced by the helicopter below about 50 knots).

The at least one equation may further include at least one sideslip equation representing nonlinear input-output relationships between the input parameters and a sideslip angle of the helicopter and operative for determining sideslip angle or for classifying the sideslip angle of the helicopter into one of four quadrants. The at least one sideslip equation is derived by means of a neural network that has been trained with a plurality of training exemplars that correspond to the input parameters, a coinciding reference speed of the helicopter and a coinciding sideslip angle derived from the coinciding reference speed. The training exemplars are measured at multiple flight conditions representing a predetermined low airspeed flight domain of the helicopter.

In accordance with the present invention, neural network technology is employed to estimate helicopter low airspeed and sideslip angle. That is, the at least one equation of the present invention is established using neural networks. Use of neural network technology allows for nonlinear transfer between input parameters and airspeed whereas previous analytical approaches for estimating helicopter low airspeed have employed linear methods. The neural networks employed include an input layer for receiving input parameters, an output layer for outputting estimated airspeed or sideslip angle, and one or more hidden layers for mapping the input layer to the output layer through a learned, nonlinear input-output relationship. The networks are trained, and the nonlinear input-output relationships learned, based on measurable quantities (i.e., measured reference speed and easily measurable variable state parameters from which the input parameters are calculated). One skilled in the art of neural networks could write a suitable program with the guidance provided herein. Additionally, commercially available neural network software packages may be used for practicing the present invention. NeuralWare, a commercially available neural network software package available from NeuralWare, Inc., 202 Park West Dr., Pittsburgh, Pa. 15275, was used in developing the network architecture of present invention. The neural network technology and how it is employed in the present invention is more fully described below.

The neural networks applicable to the present invention include, but are not limited to, backpropagation neural networks, linear vector quantization neural networks, modular neural networks, probabilistic neural networks, radial basis function neural networks, self organizing maps, and recurrent neural networks. In one preferred embodiment, a backpropagation (BP) neural network is used to predict low airspeed and a linear vector quantization (LVQ) neural network is used to classify sideslip angle into one of four quadrants.

Figure 2:
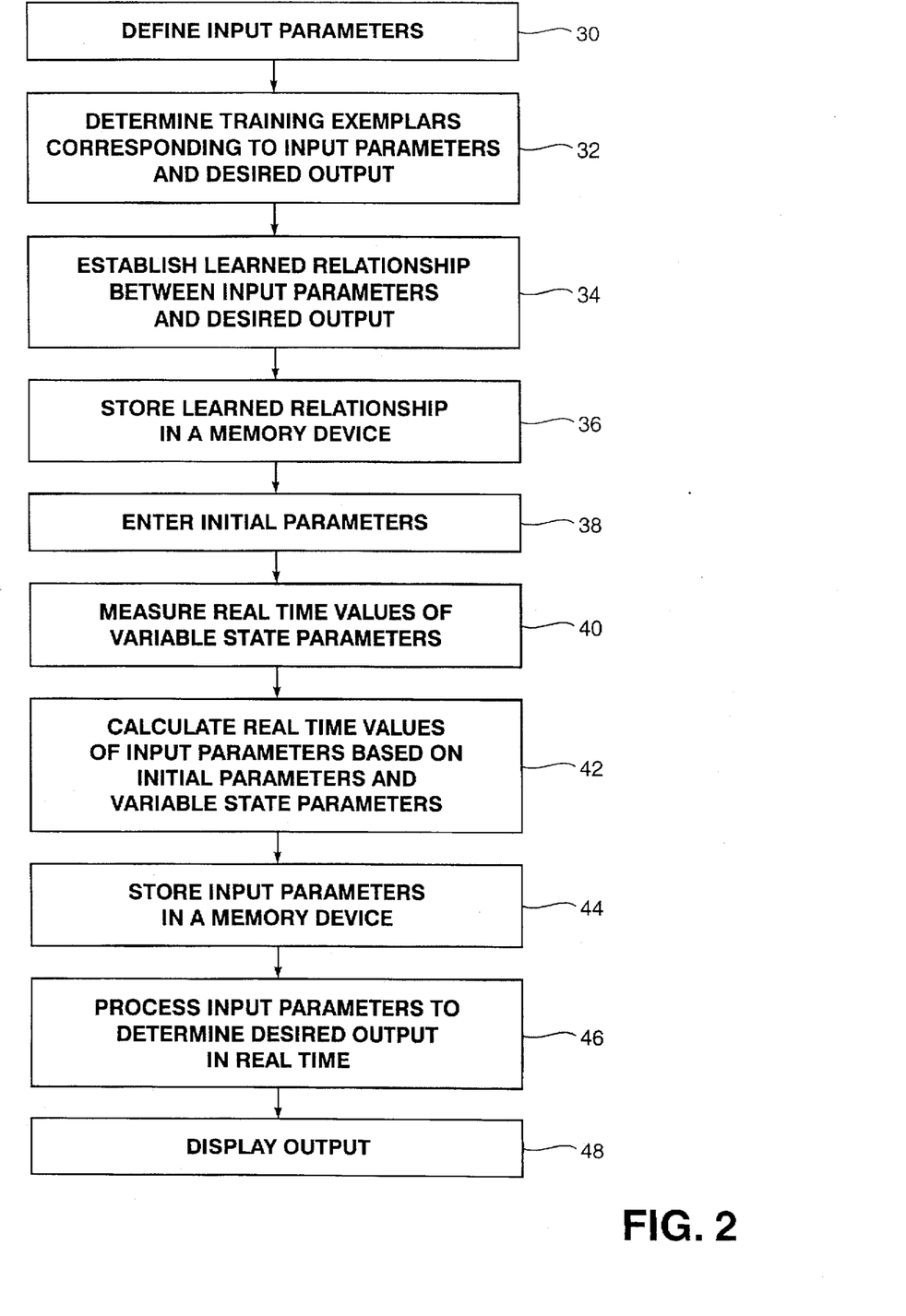
FIG. 2 is a flow chart of a method for practicing the present invention.

Referring to FIG. 2, a method (more fully described below) for practicing the present invention is presented. Initially, as represented by boxes 30–34, a neural network is trained to develop nonlinear input-output relationship between input variables and the desired output. First, at 30, the user defines input parameters which may be derived from variable state parameters that are generated during flight of the helicopter and that are measured in the helicopter fixed reference frame. Next, at 32, training exemplars used to train the network are determined. The training exemplars, which include the input parameters and a corresponding desired output (i.e., airspeed or sideslip angle), are either directly measured during test flights or are determined based on parameters measured during test flights. The data used to determine the training exemplars is measured at a plurality of flight conditions representing a predetermined low airspeed flight domain of the helicopter. Then, at 34, the neural network learns an input-output relationship between the input parameters and the corresponding desired output.

The input-output relationship is represented by at least one nonlinear equation. At 36, the at least one nonlinear equation is stored in a memory device onboard the helicopter. Once the input-output equations are installed onboard the helicopter, only the variable state parameters need be measured to estimate helicopter airspeed during low airspeed operation. At 38, initial parameters, used in calculating input parameters, are entered into a memory device onboard the helicopter. At 40, while the helicopter is operating in the low airspeed range, onboard sensors measure variable state parameters in the helicopter fixed reference frame. At 42, the input parameters are calculated based on the entered initial parameters and the measured variable state parameters. The input parameters are optionally stored, at 44, in a memory device onboard the helicopter. At 46, the input parameters are processed in accordance with the at least one nonlinear equation to determine the desired output. Finally, at 48, the desired output is displayed for use by occupants of the helicopter and/or is recorded by the aircraft monitoring system. By continuously measuring the variable state parameters at a predetermined sampling rate during low airspeed flight and then calculating and processing the input parameters, the desired output is estimated and displayed in a real time fashion.

For purposes of training the neural network a plurality of training exemplar are determined over the expected flight domain of the helicopter. With respect to estimating low airspeed, the training exemplars corresponds to the input parameters and a corresponding reference speed of the helicopter. With respect to determining or classifying sideslip angle, the training exemplars corresponds to the input parameters, a corresponding reference speed of the helicopter, and a corresponding sideslip angle. Actual helicopter low airspeed may be measured and used as the training exemplar reference speed. However, accurately measuring helicopter low airspeed is difficult, e.g., using a pace aircraft equipped with a low airspeed sensing system such as a Pacer (e.g., LORAS) low airspeed indicator. Therefore, helicopter velocity relative to the ground measured during conditions of near zero ambient winds may be used as the reference speed of the helicopter. When measuring helicopter velocity relative to the ground, tests to determine network training exemplars should be conducted only when prevailing winds are near zero (preferably below 5 knots) in order to minimize the difference between measured reference speed (relative to the ground) and true airspeed (relative to the surrounding air). Any well known method of determining helicopter velocity, such as Doppler radar, Global Positioning Satellite (GPS) systems, or Laser tracking units, may be employed and are within the scope of the present invention. Helicopter sideslip angle is derived from the measured reference speed which is broken into velocity components in the forward (i.e., longitudinal or x-direction) and sideward (i.e., lateral or y-direction) directions.

Training the neural network results in one or more neural network equations being learned. The one or more neural network equations are then converted into computer language and are installed onboard the helicopter. Once the one or more equations are installed in the helicopter, only the input parameters need be determined (based on initial parameters and easily measurable variable state parameters) to estimate the helicopter low airspeed and sideslip angle. The variable state parameters may be measured (for purposes of network training or during subsequent use for estimating low airspeed and sideslip angle) using, e.g., the well known sensors listed in Table 1.

Data set selection is a critical part of developing a successful set of neural network architecture equations. Training exemplars for training the neural network of the present invention will be selected and determined for any particular helicopter class or configuration for which the present invention is used (e.g., single rotor aircraft, tandem rotor aircraft, tilt rotor aircraft). Training exemplars should consist of data which fully represents the domain of the problem to be modeled. For example, the problem domain of the present invention is estimating airspeed and/or sideslip angle of a helicopter during low airspeed flight. Consequently, the training exemplars should cover the range of airspeed and sideslip combinations encountered in the low airspeed flight environment.

For low airspeed estimation in accordance with the present invention, the helicopter is preferably tested at airspeeds from hover to about 50 knots over a full range of sideslip angles. Depending upon the known flight envelop of a particular helicopter, steady flight data only may be used when training the system or steady and accelerating flight data may be used. The data set of training exemplars should not be weighted toward any one flight condition as such weightings may result in neural network equations that estimate airspeed well in that condition but fail in other maneuvers. In addition, factors which might significantly affect the input-output relationship represented by the network equations must be considered. For example, it has been found that the low airspeed indicator input-output relationship varies depending on whether the helicopter is operating in ground effect (IGE) or out of ground effect (OGE). These factors were considered in developing a training data set for the present invention.

As stated earlier, in one preferred embodiment of the present invention two types of neural networks were employed. A backpropagation (BP) network is preferred for predicting helicopter low airspeed and a linear vector quantization (LVQ) network is preferred for quantifying sideslip angle. Generally, a BP network architecture consists of an input layer, one or more hidden layers, and an output layer. Each hidden layer contains one or more processing elements (PEs). At each PE a transfer function with a corresponding connection weight is applied to develop a relationship between the input and output vectors. Transfer functions may be linear or nonlinear, however, nonlinear transfer functions are preferred. LVQ network architecture consists of an input layer containing input parameters, a Kohonen layer containing Kohonen PEs, and an output layer containing the network outputs. At each PE a transfer function with a corresponding connection weight is applied to develop a relationship between the input and output vectors. Transfer functions may be linear or nonlinear, however, nonlinear transfer functions are preferred. LVQ neural networks are classification networks that classify related outputs into output groups referred to as classification outputs. A PE group (an equal number of Kohonen PEs) is assigned to each classification output. Each PE group maps only to its assigned classification output.

The BP neural network architecture used for estimating airspeed includes an input layer containing the input parameters listed in Table 1 and an output layer containing estimated airspeed as the single output. In the preferred embodiment, nonlinear transfer functions are employed in the hidden layers. During network training, the input parameters are entered into the network and initially a random set of connection weights is applied. The resulting network output (estimated airspeed) is compared with the desired output (measured reference speed) and the error (difference between estimated airspeed and reference speed) is backpropagated through the connection weights which are adjusted appropriately. The process is iteratively repeated with new correction weights until the error between estimated airspeed and reference speed is minimized.

Figure 3:
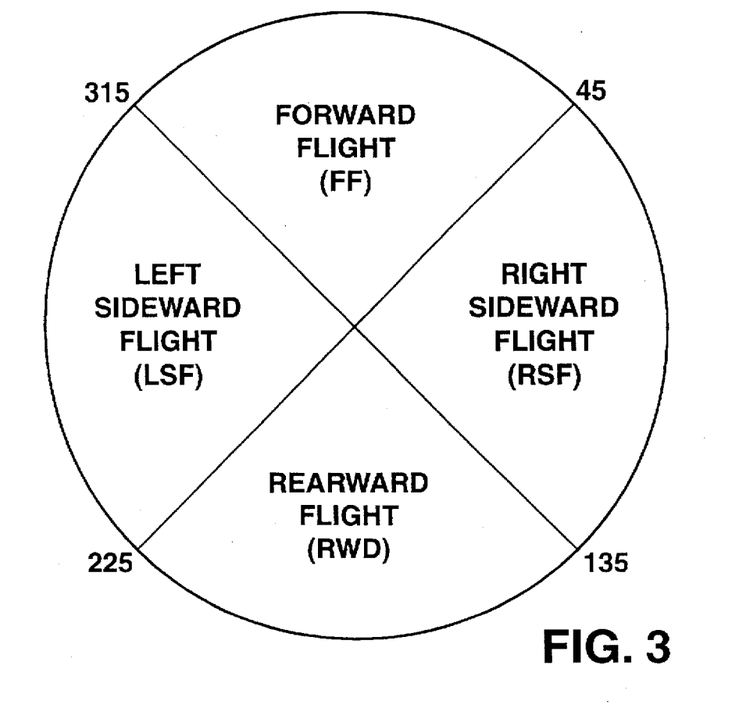
FIG. 3 shows the four quadrants for classifying sideslip angle in accordance with the present invention.

The LVQ neural network architecture used to classify sideslip angle includes an input layer containing the input parameters listed in Table 1 and an output layer containing four classification outputs. As shown in FIG. 3, the four classification outputs classify sideslip angle into: (1) a forward flight (FF) classification corresponding to a sideslip angle of between 315 degrees and 45 degree (i.e., ±45 degrees from 0 degree sideslip angle flight); (2) a right sideward flight (RSF) classification corresponding to a sideslip angle of between 45 degrees and 135 degrees; (3) a rearward flight (RWD) classification corresponding to a sideslip angle of between 135 degrees and 225 degrees; and (4) a left sideward flight (LSF) classification corresponding to a sideslip angle of between 225 degrees and 315 degrees.

The total number of PEs required in the Kohonen layer is data dependent and is generally set at a percentage of training data points employed to train the network. One skilled in the art of neural networks may determine the optimum percentage. In the embodiment tested during development of the present invention, the number of Kohonen PEs corresponds to about 10% of the number of training data points. Thus, there were 170 PEs in the OGE network and 315 PEs in the IGE network.

LVQ network training occurs in two stages. During the first stage, input parameters are entered into the network. The network, at this point, has a random set of connection weights. For each input parameter set, the winning PE group (i.e., the PE group that maps most closely to the appropriate known reference output) is determined. During the first stage, the connection weights of the winning PEs are iteratively adjusted to improve correlation between input parameters and classification output. The first stage of training results in a reasonably good classification network being developed. During the second stage of training, network refinement is performed. By refining the connection weights, miscalculations near the boundaries between classification quadrants are addressed until classification errors are minimized. In the embodiment tested during development of the present invention, the training data set was passed through the network 45 times before classification error was minimized.

During development of the present invention, two data sets were developed, one for training the networks (i.e., training exemplars) and one for testing the networks. Flight test data, corresponding to the network training exemplars, was collected during low airspeed tests of a Navy CH-46 helicopter at the Naval Air Warfare Center, Aircraft Division, Patuxent River, Md. The Navy CH-46 helicopter was tested at airspeeds from hover to 50 knots over a full range of sideslip angles. Data was recorded during steady flight conditions as well as during accelerating forward flight starting from a hover. Reference speed was determined from the helicopter speed with reference to the ground and was measured using Doppler radar. Tests were conducted only when prevailing winds were below 5 knots to minimize uncertainty in the reference speed data. Since winds were not accounted for during the flight test, the uncertainty in reference speed data is approximately ±5 knots.

Helicopter sideslip angle was derived from the Doppler velocities which were broken into forward and sideward velocity components. The uncertainty of the reference sideslip angle is more significantly affected by prevailing winds particularly at low reference speeds. Sideslip angle uncertainty ranges from ±90 deg at 5 knots to ±5 deg at 50 knots.

Fifteen input parameters, measured or determined during flight tests with the CH-46 helicopter (two engine torques were measured), were used in developing the exemplary network equations. The full data base was first separated into data corresponding to steady flight conditions and data taken during accelerating forward flight conditions. In the examples presented below, only steady flight conditions were considered. To evenly represent the domain of the low airspeed problem, a "binning" method was developed. The data was separated into 36 sideslip ranges (10 deg intervals from 0 to 360 deg), 10 velocity ranges (5 knot intervals, from 0 to 50 knots), and 3 gross weight ranges (high, medium, and low gross weights). Thus, the data was partitioned into a possible 1080 bins. The training set was developed by randomly selecting a predetermined number of data points from each bin. If a particular bin had less that the preselected quantity of data points, then all of the data points in that bin were selected.

The test data set consists of all data remaining in the 1080 bins after the training data are removed. The test data are used to evaluate the network performance using data not previously encountered by the network (i.e., data it was not trained on) and, thus, provides a measure of how well the network generalizes.

As stated earlier, low airspeed indicator input-output relationships vary depending on whether the helicopter is operating in ground effect (IGE) or out of ground effect (OGE). Generally, the helicopter is considered as operating IGE when the altitude is less than 1.5 rotor diameters. Whether the helicopter was operating IGE or OGE was determined in the present case by reference to the pressure altitude measurement. The ground effect induces changes in static pressure which result in a zero or negative pressure altitude reading. Thus, a zero or negative pressure altitude reading gives an indication that the helicopter is operating IGE. To determine whether operation IGE or OGE significantly affects optimization of the neural network architecture and, thus, performance of the virtual sensor, three separate training and test sets were developed. The first training and test sets, referred to as the baseline data, consisted of all the steady flight conditions available. The second and third training and test sets were subsets of the baseline data corresponding to OGE data and IGE data, respectively.

Figure 4:
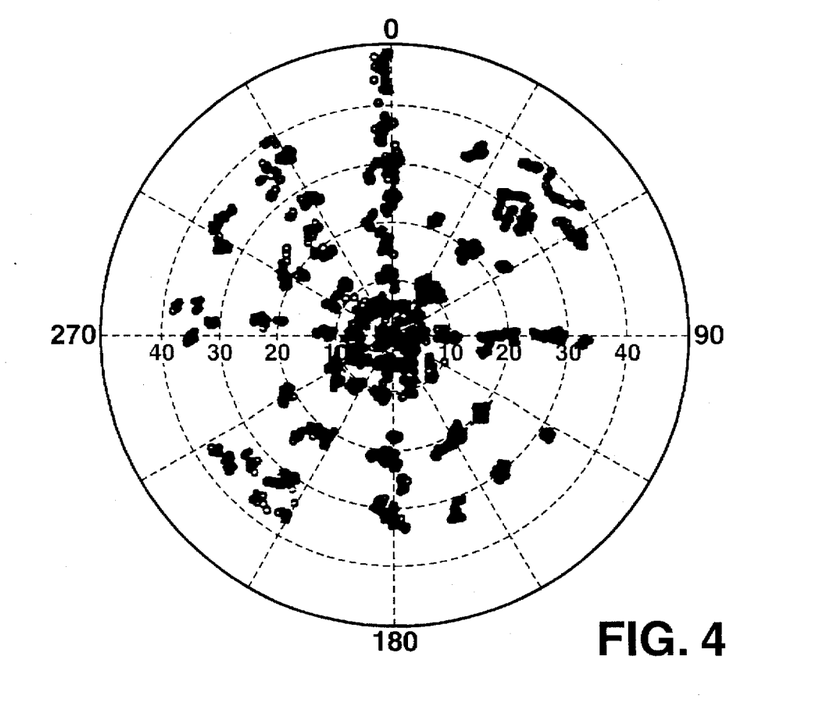
FIG. 4 represents a typical data set for training or testing the neural networks in accordance with the present invention.

FIG. 4 represents an exemplary data set (training or test set) showing the flight conditions at which data was collected. The radial lines correspond to velocity in knots while the azimuthal lines correspond to sideslip angle. A zero degree sideslip angle represents forward flight while a 180 degree sideslip angle represents rearward flight. A 90 or 270 degree sideslip angle represents right or left sideward flight, respectively. In the exemplary data set, samples were taken at a rate of 10 Hz during steady flight conditions. However, the present invention applies equally to networks trained using data taken under different flight conditione (e.g., accelerating flight, vertical replenishment flight). For the present examples, there were 5582 OGE data points and 8770 IGE data points.

A parametric study was conducted on the OGE data set to determine the optimum neural network architecture for the preferred BP network used for estimating low airspeed. The number of hidden layers and the number of PEs per layer was varied to determine which architecture best estimated airspeed. The statistical parameters used to determine the optimum architecture were the Pearson's correlation coefficient (R) and the root mean square (RMS) error of the test data set. Pearson's correlation coefficient is a measure of the linearity of the relationship between estimated airspeed and measured reference speed. The RMS error provides a measure of the resulting error in airspeed predictions when entering the test data set into the network. Performance of the neural network on the training data set will generally be good. Therefore, the test data set containing data not previously encountered by the network is used to test architecture optimization. In the present example, the neural network was trained using the training data set for 640,000 iterations (i.e., the entire training data set was passed through the network 375 times). Every 80,000 iterations the resulting network nonlinear input-output relationship equation was saved and evaluated using the test data set. The network was considered to be optimized when the RMS error for the test data set stabilized. This typically occurred around 500,000 iterations.

Results of the neural network architecture optimization are shown in Table 2. The preferred BP network architecture for predicting low airspeed comprises a two hidden layer network with 25 PEs in each layer. For the preferred network architecture, the RMS error for the OGE test data set was small and R was close to one. An alternative architecture comprising a two hidden layer system with 65 PEs per layer produced a slightly smaller RMS error. However, this improvement was not considered significant enough to warrant the added complexity of the additional PEs.

TABLE 2

| Number of Hidden Layers | Number of PEs per Layer | Test Set RMS Error (knots) | Test Set R |
|---|---|---|---|
| 1 | 25 | 3.440 | 0.968 |
| 1 | 65 | 2.895 | 0.976 |
| 2 | 15 | 2.842 | 0.976 |
| 2 | 25 | 2.697 | 0.979 |
| 2 | 65 | 2.676 | 0.979 |

The nonlinear airspeed equation developed by the back-propagation neural network is:

$$\text{Airspeed} = \sum_{k=1}^{x} u_k \tanh \left\{ \sum_{m=1}^{y} v_{mk} \tanh \left[ \sum_{n=1}^{z} w_{nm} \tanh(i_n) \right] \right\}$$

where:

$u_k$ represents the connection weight between hidden layer 2 processing element k and the output (i.e., airspeed);

$v_{mk}$ represents the connection weight between hidden layer 1 processing element m and hidden layer 2 processing element k;

$w_{nm}$ represents the connection weight between input n and hidden layer 1 processing element m; and $i_n$ represents the input parameters.

The hyperbolic tangent function (tanh) was the BP network transfer function used in estimating airspeed. The three sets of connection weights determine the network's success in mapping the input parameters to the output. The training process which the network undergoes adjusts the weights. The summations from [k=1 to x] and [m=1 to y] depend upon the number of PEs chosen for each hidden layer. In the preferred network, with 25 PEs in each hidden layer, x and y are both 25. The summation [n=1 to z] depends upon the number of input parameters.

EXAMPLE 1

Figure 5:
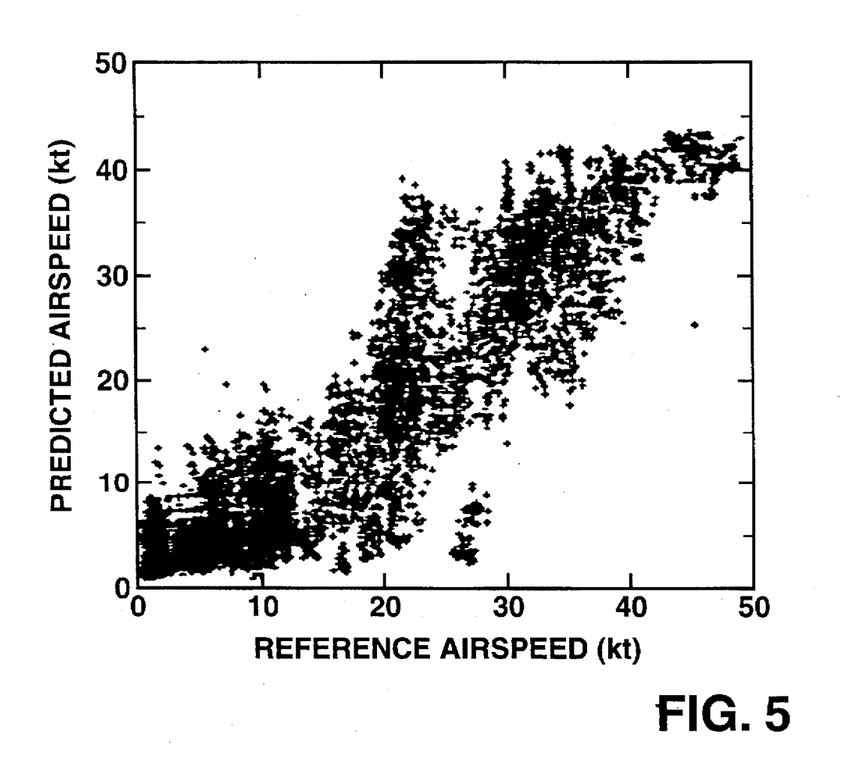
FIG. 5 presents preliminary airspeed predictions using a test data set containing both in and out of ground effect data.
Figure 6A:
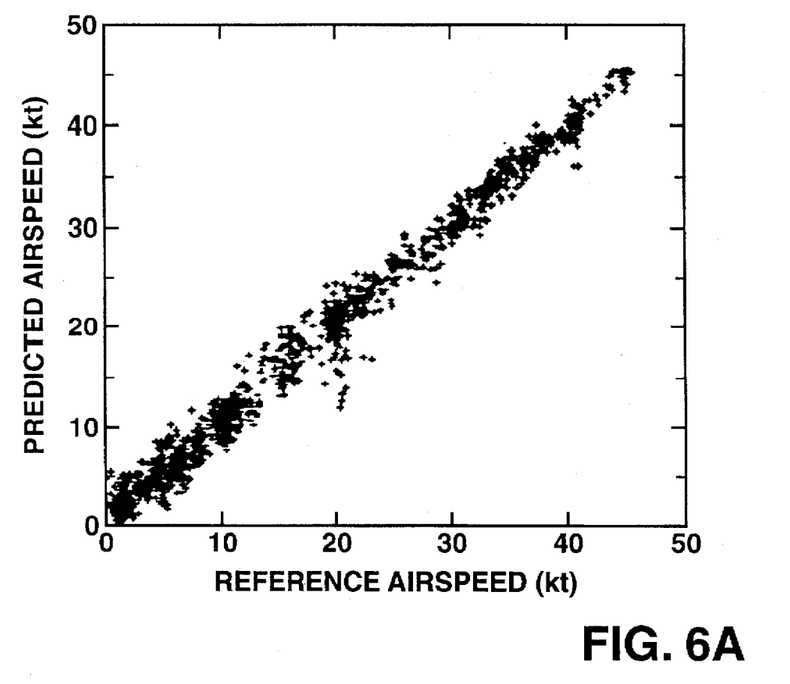
FIGS. 6A and 6B present airspeed predictions using test and training data sets, respectively, containing out of ground effect data only.
Figure 6B:
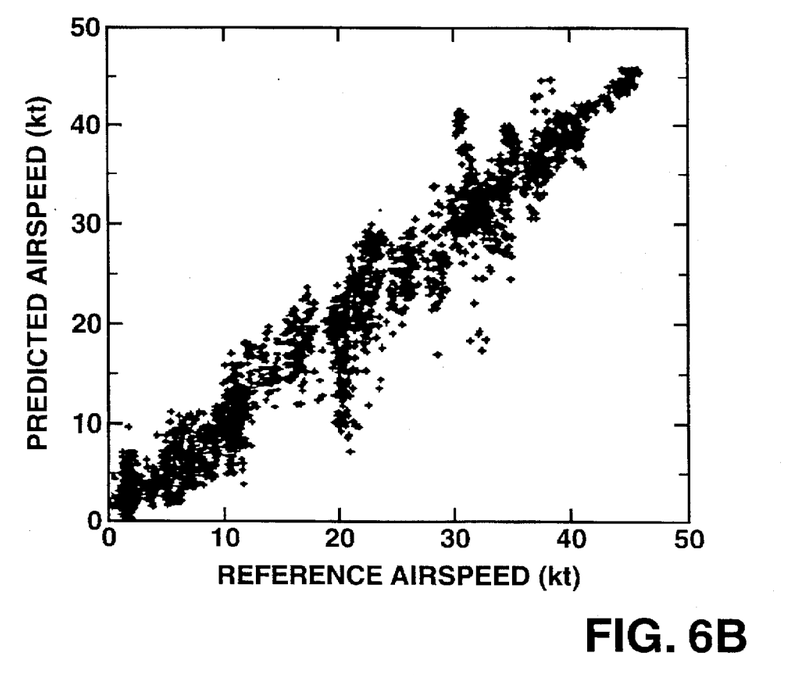
Figure 7:
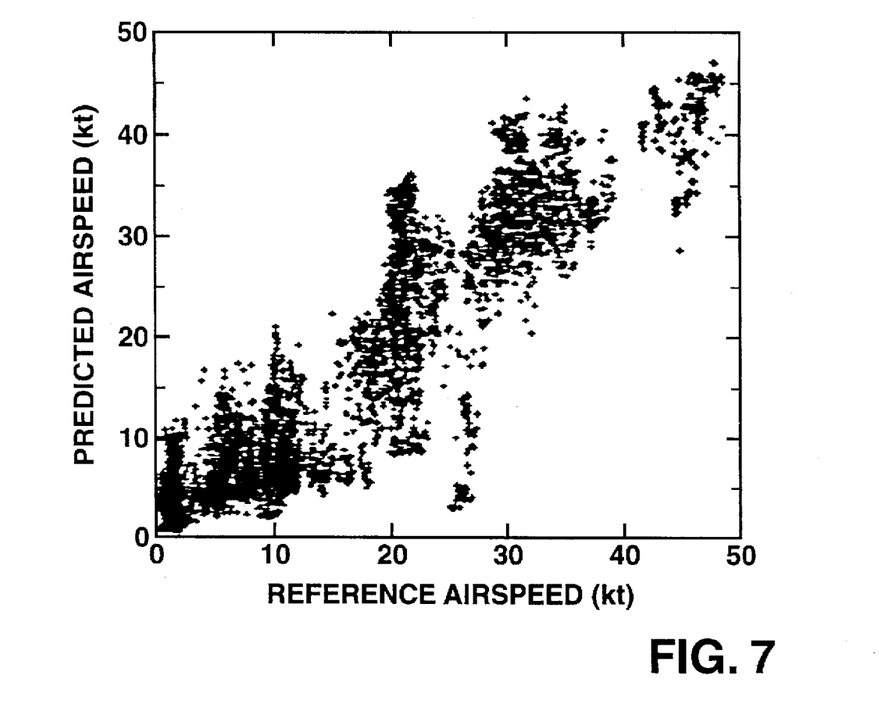
FIG. 7 presents airspeed predictions using a test data set containing in ground effect data only.

Airspeed Estimation:

In accordance with the present invention, low airspeed of Navy CH-46 helicopter was estimated based on the 15 input parameters and the network equations learned during network training. FIG. 5, presents results with the optimum network architecture (i.e., 2 hidden layer BP network with 25 PEs per layer) on the baseline test data set, which includes both IGE and OGE data. By dividing the baseline data set into two subsets consisting of IGE data and OGE data, it becomes evident that ground effect has a significant influence on the relationship between aircraft variable state parameters, as represented by the input parameters, and estimated airspeed. As shown in FIGS. 6A (OGE training data set) and 6B (OGE test data set), practicing the present invention during OGE flight only (i.e., using OGE data only) results in significant improvement in estimating low airspeed. FIG. 7 shows that modeling airspeed during IGE flight (i.e., using IGE data only) is more challenging. This is not unexpected, since the ground effect environment is quite complex with unsteady flow affecting pilot controls.

Figure 8:
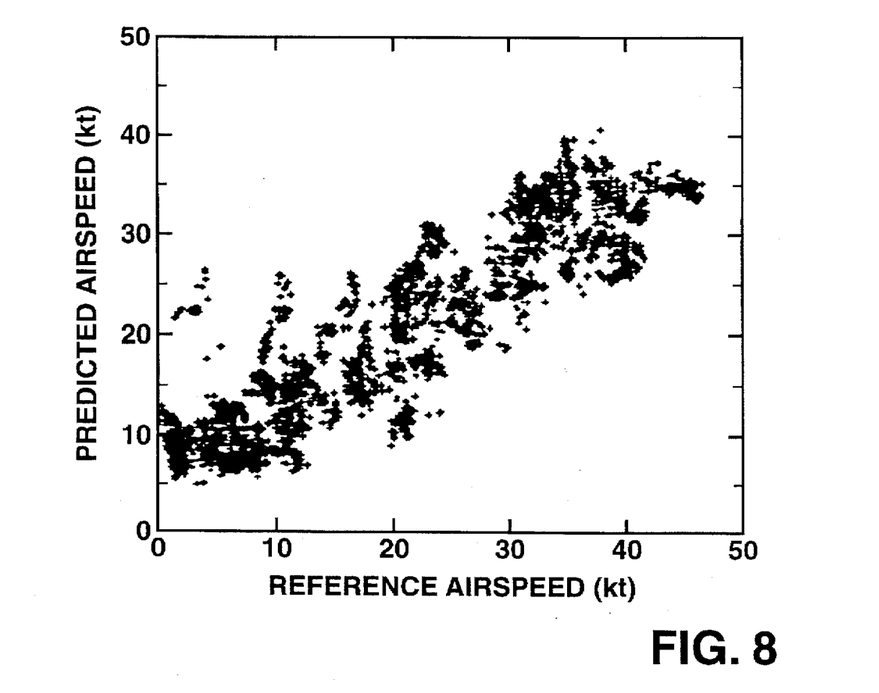
FIG. 8 presents airspeed predictions using a linear model and a test data set containing out of ground effect data.

To examine the degree of nonlinearity between input parameters and estimated airspeed, the network architecture with 2 hidden layers and 25 PEs per layer was modified by changing the nonlinear hyperbolic tangent transfer function of the PEs to a linear transfer function. A linear transfer to the output was also applied. By using this technique, the network becomes equivalent to a linear regression analysis. Thus, the importance of nonlinearities in correctly modeling the low airspeed domain can be assessed. Results of determining low airspeed using input parameters measured during OGE flight and the linearized network architecture are shown in FIG. 8. Although the linear regression technique captures the general trends correctly, the present invention with predetermined nonlinear input-output relationship between input parameters and airspeed is required to improve accuracy significantly.

A statistical analysis of the nonlinear neural network error indicates that the error is close to a normal distribution with a mean of zero. Consequently, when using a BP network architecture to predict helicopter low airspeed, 95.5% of the data predictions will fall within $\pm 2\sigma$ where $\sigma$ is the RMS error. Table 3 shows results of the test data sets for the four cases examined.

TABLE 3

|  | R | RMS Error (knots) | Accuracy $\pm 2\sigma$ (knots) |
|---|---|---|---|
| Nonlinear Network OGE & IGE Data | 0.92 | ±5.2 | ±10.4 |
| Nonlinear Network OGE Data | 0.98 | ±2.7 | ±5.4 |
| Nonlinear Network IGE Data | 0.92 | ±4.9 | ±9.8 |
| Linear Network OGE Data | 0.92 | ±5.7 | ±11.4 |

Helicopter low airspeed is predicted within ±5.4 knots when the aircraft is operating out of ground effect. This accuracy is very good given that the measured reference speed has an uncertainty of ±5.0 knots.

EXAMPLE 2

Sideslip Angle Classification:

In accordance with the present invention, sideslip angle during low airspeed flight of a Navy CH-46 helicopter was classified based on the 15 input parameters and the network equations learned during network training. Sideslip angle was initially modeled using the same BP network architecture as was used for airspeed predictions (i.e., the 2 hidden layer network with 25 PEs in each layer). However, the BP network architecture was not successful for sideslip angle predictions for the OGE test data set. It was postulated that lack of correlation in sideslip angle may result because the uncertainty in reference measurements using Doppler radar is quite high at airspeeds below 15 knots. However, removing OGE data below 15 knots and retraining the network did not improve accuracy.

Since the BP network produced unsatisfactory results when estimating sideslip angle, an alternative approach was developed based on classification of sideslip angle into four quadrants as shown in FIG. 3 and discussed above. A linear vector quantization (LVQ) network was chosen. Table 4 presents results of sideslip angle classification for OGE and IGE flight conditions. Successful classification rates for each sideslip angle quadrant and an average successful classification rate (AVE, average of the four quadrant successful classification rates) are presented.

TABLE 4

|  | Successful sideslip angle classification rate (%) | | | | |
| --- | --- | --- | --- | --- | --- |
|  | FF | RSF | RWD | LSF | AVE |
| OGE Training Set | 98 | 98 | 99 | 97 | 98 |
| OGE Test Set | 94 | 94 | 89 | 80 | 89 |
| IGE Training Set | 98 | 99 | 99 | 98 | 98 |
| IGE Test Set | 94 | 95 | 94 | 72 | 89 |

Based on the premise that reference sideslip angle derived from airspeed measurements made below 15 knots have a high degree of inaccuracy, all input parameters corresponding to airspeed below 15 knots (i.e., input parameters calculated from variable state parameter data measured below 15 knots) were removed and the LVQ network was retrained. Table 5 presents results of sideslip angle classification for OGE and IGE flight conditions with data for reference airspeeds below 15 knots removed.

TABLE 5

|  | Successful sideslip angle classification rate (%) | | | | |
| --- | --- | --- | --- | --- | --- |
|  | FF | RSF | RWD | LSF | AVE |
| OGE Training Set | 99 | 99 | 100 | 99 | 99 |
| OGE Test Set | 92 | 90 | 100 | 99 | 95 |
| IGE Training Set | 99 | 100 | 99 | 100 | 100 |
| IGE Test Set | 96 | 100 | 94 | 65 | 89 |

Sideslip angle classification during OGE flight was significantly improved by using the LVQ network trained with data corresponding to airspeeds of 15 knot and greater. Average successful classifications improved to 95% on the test data. However, IGE test results showed no net improvement. For OGE flight, the difficulty in classifying left sideward flight was eliminated when below 15 knot data were removed. However, for this case, the left sideward flight classification was worse for IGE flight. This suggests that, rather than inaccuracy in below 15 knot measurements, a dynamic unsteady flow region is created during IGE flight of the tandem rotor CH-46 helicopter that makes classifying left sideward flight difficult.

Although specific input parameters, initial parameters, variable state parameters, networks and network architectures were employed in the present examples, other input parameters, initial parameters, variable state parameters, networks and architectures are equally applicable to the present invention. For different classes and configurations of helicopters, different variable state parameters may be more easily measured or more applicable to measurement. Moreover, for different classes and configurations of helicopters, airspeed and sideslip angle may be estimated better using different input parameters, initial parameters, variable state parameters, networks or network architectures. One skilled in the arts of helicopter airspeed determination and of neural networks can determine which input parameters would be most advantageous and the optimum network and network architecture for predicting the desired output based on the guidance provided herein.

The advantages of the present invention are numerous. The present means and method for estimating low airspeed and sideslip angle provide a mechanically simple, inexpensive alternative to current low airspeed measurement technology. The neural network based means for determining low airspeed and sideslip angle uses only helicopter variable state parameters measured in the fixed reference frame of the helicopter fuselage. Thus, problems associated with complex and expensive methods of transferring information from the rotating reference frame of the rotors to the nonrotating reference frame of the fuselage are eliminated. Furthermore, since the input parameters for the neural network are quantities that are commonly measured by helicopter flight data recording systems, the present invention may be easily and economically implemented without the added maintenance burden of additional sensors. The present invention is capable of improving both maintenance (by improving the performance of health and usage monitoring systems) and safety for those helicopters not equipped with low airspeed measurement systems.

The present invention and many of its attendant advantages will be understood from the foregoing description and it will be apparent to those skilled in the art to which the invention relates that various modifications may be made in the form, construction and arrangement of the elements of the invention described herein without departing from the spirit and scope of the invention or sacrificing all of its material advantages. It is therefore to be understood, the forms of the present invention herein described are not intended to be limiting but are merely preferred or exemplary embodiments thereof and, within the scope of the appended claims, the invention may be practiced other than as specifically described.

What is claimed is:

1. A method for estimating airspeed information of a helicopter operating in a low airspeed flight range of below about 50 knots, said airspeed information estimated in a real time fashion, said method comprising the steps of:

(a) defining input parameters derivable from variable state parameters generated during flight of the helicopter, said variable state parameters measurable in a nonrotating reference frame associated with the helicopter;

(b) determining said input parameters and a coinciding reference speed information at a plurality of flight conditions representing a predetermined low airspeed flight domain of the helicopter;

(c) establishing a learned relationship between said determined input parameters and said coinciding reference speed information, said relationship represented by at least one nonlinear equation;

(d) storing said at least one nonlinear equation in a memory onboard the helicopter;

(e) measuring real time values of said variable state parameters during low airspeed flight of the helicopter;

(f) calculating real time values of said input parameters;

(g) processing said real time values of said input parameters in accordance with said at least one nonlinear equation to determine said airspeed information; and (h) displaying said airspeed information.

2. A method as in claim 1 wherein said coinciding reference speed information is a coinciding reference speed of the helicopter, said airspeed information is low airspeed of the helicopter, and said step (c) is performed using a neural network that has been trained with training exemplars, said training exemplars corresponding to said input parameters and said reference speed, said training exemplars measured at a plurality of flight conditions representative of a flight domain experienced by the helicopter below about 50 knots such that step (c) results in at least one airspeed equation representing a nonlinear input-output relationship between said input parameters and said reference speed.

3. A method as in claim 2 wherein said neural network is a backpropagation neural network.

4. A method as in claim 1 comprising the further steps of continuously repeating steps (e) through (h) at a predetermined sampling rate during said low airspeed flight.

5. A method as in claim 1 comprising the further step, performed prior to step (f), of inputting into a memory onboard the helicopter at least one initial parameter, said at least one initial parameter used during step (f) to calculate said input parameters.

6. A method as in claim 1 wherein steps (b) and (e) are performed with the helicopter operating in an out of ground effect flight condition.

7. A method as in claim 1 wherein said input parameters determined during step (b) and calculated during step (f) include:

a helicopter gross weight;

a helicopter center of gravity;

a longitudinal cyclic stick position;

a lateral cyclic stick position;

a collective stick position;

a pilot pedal position;

a pitch attitude;

a roll attitude;

a pitch rate;

a roll rate;

a yaw rate;

at least one engine torque;

at least one rotor rotational speed; and a helicopter altitude.

8. A method as in claim 5 wherein said inputting step includes inputting a takeoff weight and a takeoff center of gravity position of the helicopter; and wherein said step (e) is performed at a predetermined sampling rate and includes the steps of:

measuring fuel expended;

measuring longitudinal cyclic stick position;

measuring lateral cyclic stick position;

measuring collective stick position;

measuring pedal position;

measuring pitch rate, roll rate, and yaw rate;

measuring at least one engine torque;

measuring at least one rotor rotational speed; and measuring static pressure of the surrounding air.

9. A method as in claim 1 wherein said coinciding reference speed information is a coinciding reference sideslip angle of the helicopter, said airspeed information is a sideslip angle during low airspeed flight of the helicopter, and said step (c) is performed using a neural network that has been trained with training exemplars, said training exemplars corresponding to said input parameters, a coinciding reference speed of the helicopter and said reference sideslip angle, said reference sideslip angle derived from said reference speed, said training exemplars measured at a plurality of flight conditions representative of a flight domain experienced by the helicopter below about 50 knots such that step (c) results in at least one sideslip equation representing a non-linear input-output relationship between said input parameters and said reference sideslip angle.

10. A method as in claim 9 wherein said neural network is a linear vector quantization neural network.

11. A method of determining low airspeed of a helicopter comprising the steps of:

measuring a plurality of variable state parameters generated during flight of the helicopter, said variable state parameters measured in a nonrotating reference frame associated with the helicopter;

determining a plurality of input parameters based on said measured variable state parameters;

placing said plurality of input parameters in a memory; and processing said plurality of input parameters by means of a neural network that has been trained with a plurality of training exemplars corresponding to said variable state parameters and a coinciding reference speed of the helicopter, said training exemplars measured at a plurality of flight conditions representing a predetermined low airspeed flight domain of the helicopter, said neural network responsive to values of said variable state parameters not previously encountered for deriving said low airspeed of the helicopter based upon said plurality of input parameters.

12. A method as in claim 11 wherein said neural network is a backpropagation neural network.

13. A method as in claim 12 comprising the further step of displaying said low airspeed derived during said processing step.

14. A method as in claim 13 comprising the further step, performed prior to said measuring step, of inputting into said memory at least one initial parameter, said at least one initial parameter used during said determining step to determine said input parameters.

15. A method as in claim 14 wherein said inputting step includes inputting a takeoff weight and a takeoff center of gravity position of the helicopter; and wherein said measuring step is performed at a predetermined sampling rate and includes the steps of:

measuring fuel expended;

measuring longitudinal cyclic stick position;

measuring lateral cyclic stick position;

measuring collective stick position;

measuring pedal position;

measuring pitch rate, roll rate, and yaw rate;

measuring at least one engine torque;

measuring at least one rotor rotational speed; and measuring static pressure of the surrounding air.

16. A method as in claim 15 comprising the further steps of continuously repeating said measuring, determining, placing and processing steps at said predetermined sampling rate during low airspeed flight of the helicopter.

17. A method as in claim 16 wherein said measuring step is performed with the helicopter operating in an out of ground effect flight condition.

* * * * *